US005347432A

United States Patent [19]

Chiavetta

[11] Patent Number: 5,347,432

[45] Date of Patent: Sep. 13, 1994

[54] PHOTOGRAPHIC LIGHTING CONTROL SYSTEM

[76] Inventor: Gary J. Chiavetta, 1212 N. 33rd Ave., Melrose Park, Ill. 60160

[21] Appl. No.: 75,644

[22] Filed: Jun. 11, 1993

[51] Int. Cl.$^5$ .................... F21V 21/00; G03B 15/02

[52] U.S. Cl. .................... 362/18; 362/278; 362/320; 362/352

[58] Field of Search .................... 362/17, 18, 6.7, 16, 362/3, 319, 320, 255, 278, 352

[56] References Cited

U.S. PATENT DOCUMENTS

| | | | |
|---|---|---|---|
| 1,172,865 | 2/1916 | Bizzoni | 362/18 |
| 1,964,591 | 6/1934 | Nanfeldt | 362/18 |
| 4,109,301 | 8/1978 | Wakimura | 362/8 |
| 4,129,898 | 12/1978 | Ohrstedt | 362/18 |
| 4,594,645 | 6/1986 | Terashita | 362/18 |
| 4,813,764 | 3/1989 | Morris | 362/3 |
| 5,154,503 | 10/1992 | Sternsher | 362/18 |

*Primary Examiner*—James C. Yeung
*Attorney, Agent, or Firm*—Charles F. Meroni, Jr.

[57] ABSTRACT

The photographic light control system includes a plurality of structures for causing a particular, selectable convergence of light emanating from a photographic light source such as a flash unit. The system is essentially generic in nature by accommodating a variety of light sources, such accommodation being produced by a sleeve of the system which includes a drawstring engagement thereon for accommodating various sized light source housings.

10 Claims, 3 Drawing Sheets

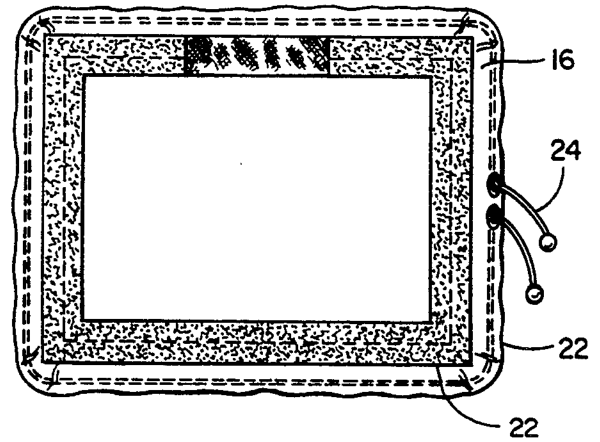
Fig. 10
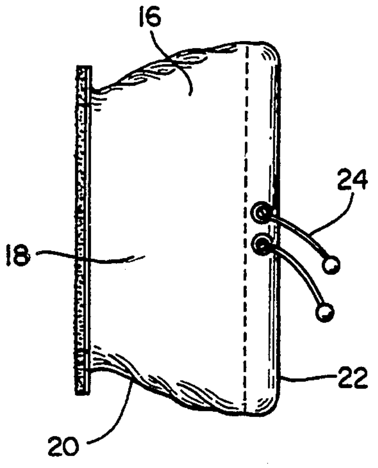
Fig. 11
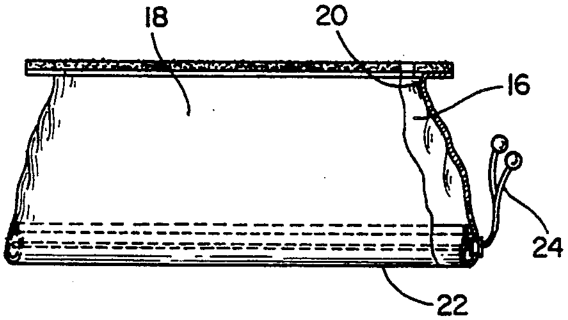
Fig. 12
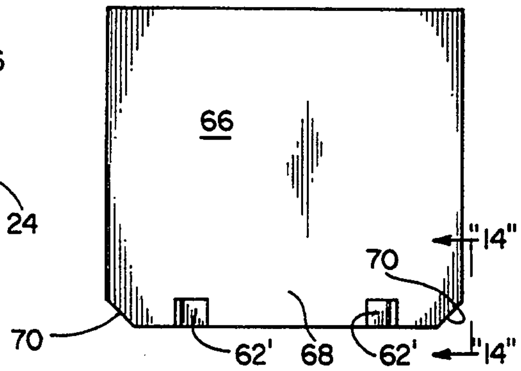
Fig. 13
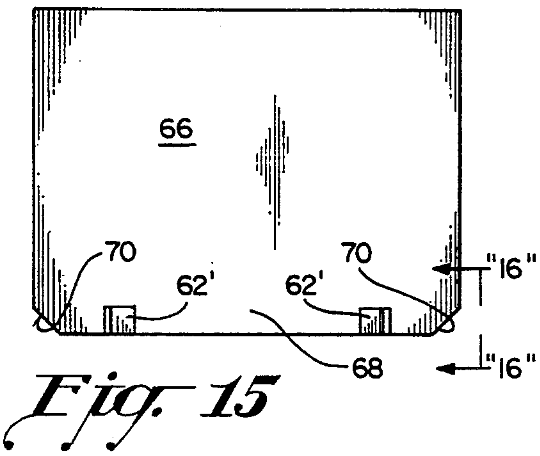
Fig. 15
Fig. 14
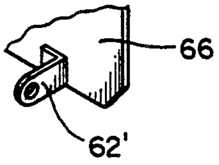
Fig. 16
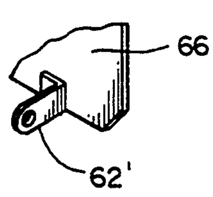

PHOTOGRAPHIC LIGHTING CONTROL SYSTEM

BACKGROUND OF THE INVENTION

1. Field of the Invention

The present invention relates to a control system for controlling lighting in a photographic situation. More particularly, the system may be utilized with light sources such as video, hot shoe, handle mount or similar camera lighting units and includes a plurality of system components which are structured to accommodate a variety of light sources, for directing light emanating from the source in a convergent manner.

2. Description of the Prior Art

Heretofore, various separate components have been provided for control of lighting in photographic situations, with each component being light source specific.

For example, light bounce is controlled by use of a diffuser as disclosed in the Stone U.S. Pat. No. 4,539,624, the Schimmelpfennig U.S. Pat. No. 3,555,264 and the Perkins U.S. Pat. No. 3,609,345.

Light fittings for directing light commonly referred to as a "snoot" are known as disclosed in the Letchre U.S. Pat. No. 4,428,036.

Focusing hoods are also known as disclosed in the Buchhop et al U.S. Pat. No. 964,406.

Lens hoods used for focusing effects and commonly referred to as a "barn door" are disclosed in the Shinn U.S. Pat. No. 1,591,567; the Bailey U.S. Pat. No. 1,378,208; the Garfield U.S. Pat. No. 843,449; and the Dorr U.S. Pat. No. 720,900.

Further, self locking systems for engaging items together quickly have been proposed in the Perina U.S. Pat. No. 3,658,107; the Perina U.S. Pat. No. 3,732,600; the Slater U.S. Pat. No. 4,591,148; and the Figueroa U.S. Pat. No. 4,708,183.

As will be described in greater detail hereinafter, the control system of the present invention provides a means for modulating lighting by controlling convergence of light exiting a light source used in photography, the control system accommodating a plurality of light source forms, rather than being source specific.

SUMMARY OF THE INVENTION

According to the invention there is provided a system for controlling light emanating from a light source in a photographic situation, the system comprising structure engageable over a lens of the light source for directing light therefrom in a predetermined manner to cause convergence of the light into a chosen path, the structure comprising means for engaging a converging assembly to a housing of the light source in a manner to cause all light emanating from the light source to pass through the converging assembly, the converging assembly comprising a base adapted to engage a filter therein and having structure extending from said base and away from the lens therebehind in a manner to direct light from the lens substantially forward by limiting lateral scatter.

BRIEF DESCRIPTION OF THE DRAWINGS

FIG. 10 shows a front view of a flexible light shield having an adhering attachment structure thereon which cooperates with that on a back side of the base plate.

FIG. 11 is a side view of the light shield of FIG. 10.

FIG. 12 is similar to FIG. 11, having portions broken away to show a drawstring engagement for engaging the shield to a light source housing.

FIG. 13 is a plan view of a barn door of the system.

FIG. 14 shows a pivotable mount member used on all barn doors.

DESCRIPTION OF THE PREFERRED EMBODIMENT

Figure 1:
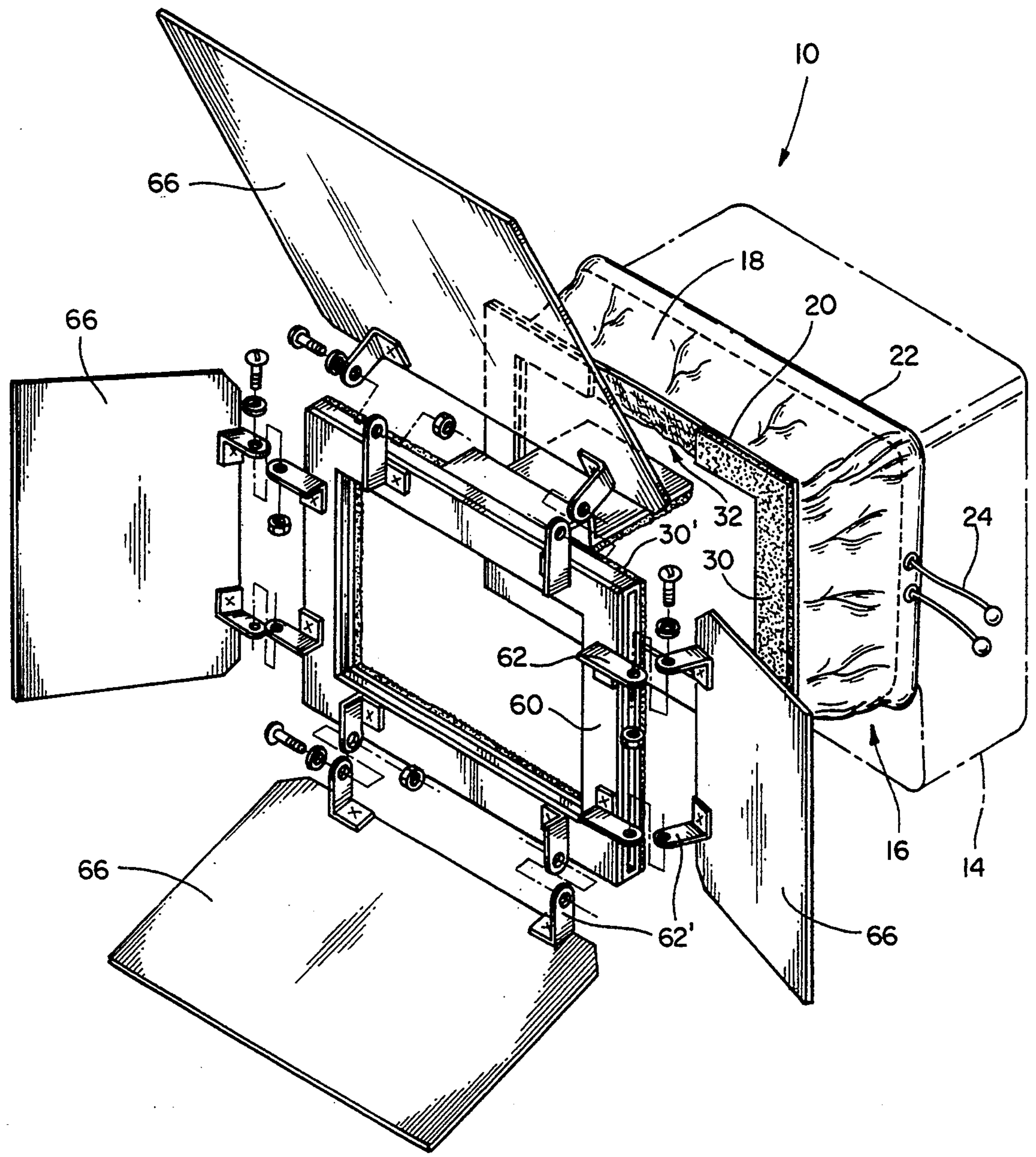
FIG. 1 is an exploded perspective view of the photography lighting control system of the present invention.
Figure 2:
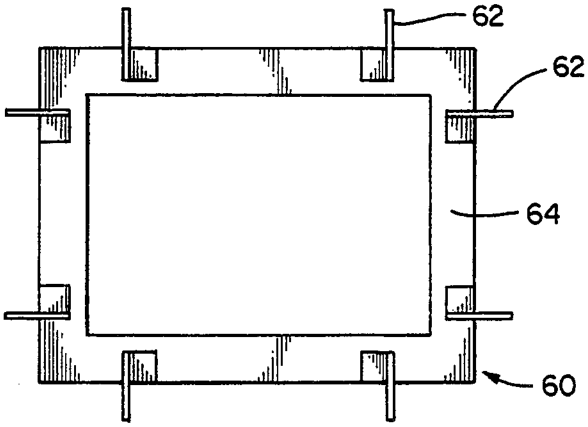
FIG. 2 is a plan view of a face plate of the system used to engage barn doors thereon.
Figure 3:
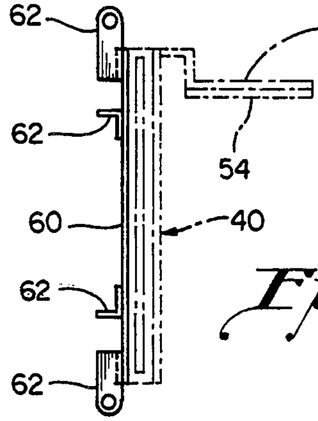
FIG. 3 is a side view of the face plate of FIG. 2.
Figure 4:
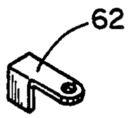
FIG. 4 is a perspective view of a pivotable mount member of the face plate.
Figure 5:
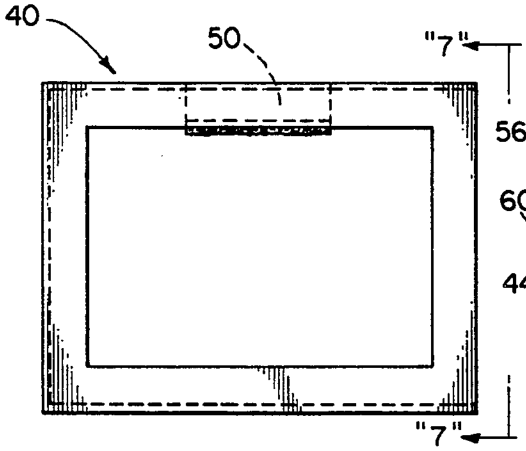
FIG. 5 is a plan view of a support plate for the face plate.
Figure 6:
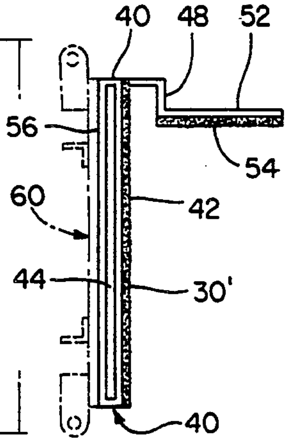
FIG. 6 is a side view of the support plate showing a connecting arm thereof.
Figure 7:
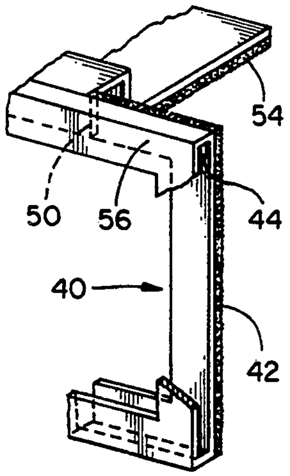
FIG. 7 is a partial perspective view of the base plate showing a filter engaging channel therein.

Referring now to the drawings in greater detail, there is illustrated therein the photographic lighting control system 10 made in accordance with the teachings of the present invention.

Figure 15:
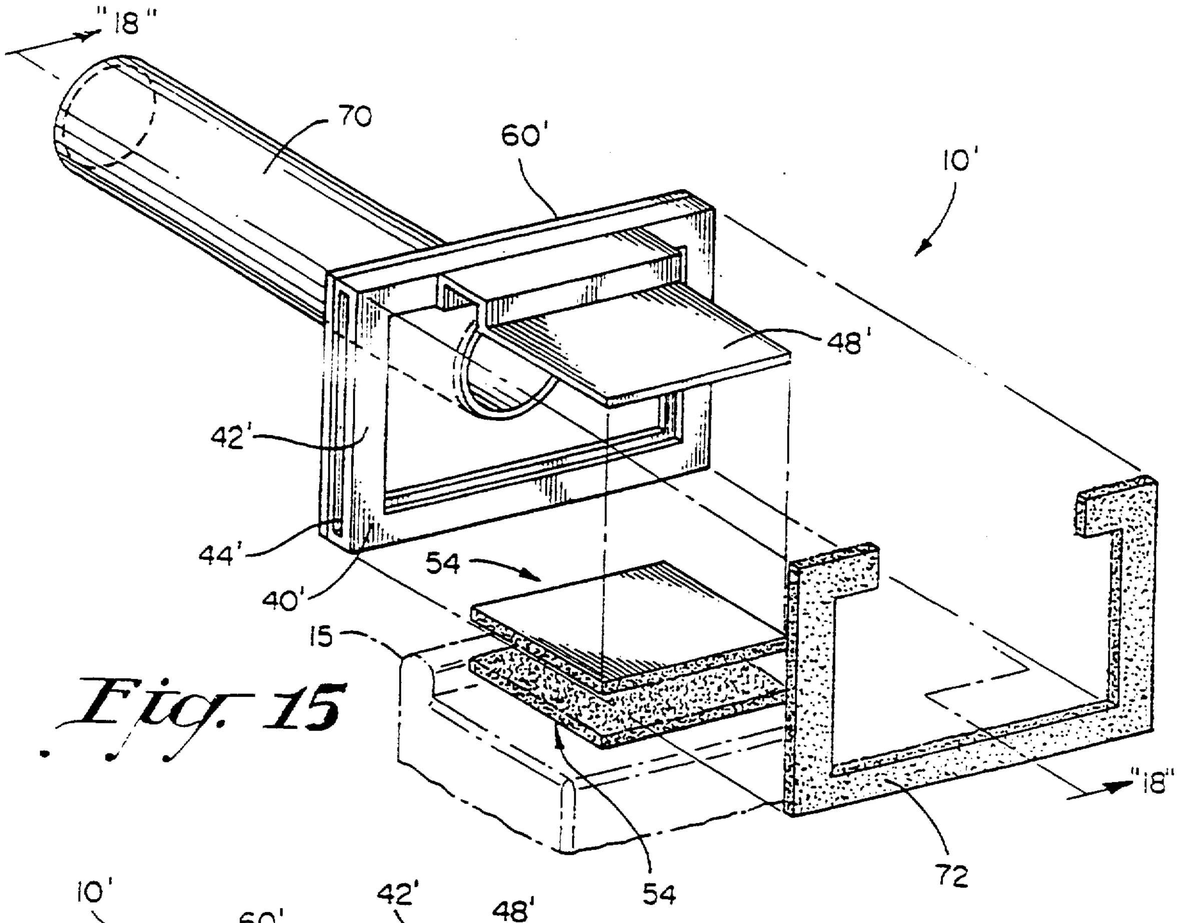
FIG. 15 is an exploded perspective view of a snoot assembly for use in the system in directing a narrow beam of light.
Figure 16:
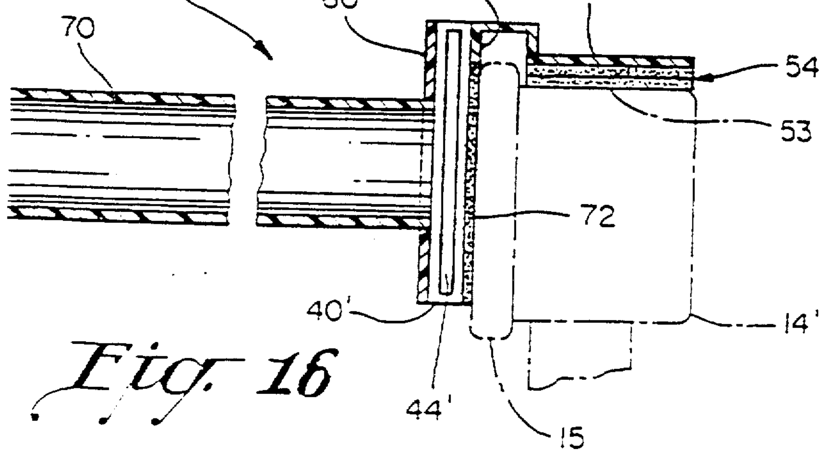
FIG. 16 is a cross sectional view showing the snoot assembly engaged to a camera flash unit, shown in phantom.

In FIGS. 1–14, a system 10 for producing narrow angle lighting is shown while in FIGS. 15–16 a system 10' for producing a narrow beam of light is shown.

Turning first to FIGS. 1–14, the system 10 is shown engaged over a lens (not shown) of a generic light source 14, the light source 14 being shown in phantom.

Such generic light source 14 is typically provided with a peripheral lip 15 (FIGS. 15 and 16) defined around a circumference of the lens.

To create an engagement of the system 10 to the light source housing 14, a sleeve 16 having side walls 18 which converge to a smaller forward opening 20 is provided. A rear edge 22 of the sleeve 16 includes a drawstring 24 therein which secures the sleeve 16 to the light source 14 when tightened behind the lip 15.

Figure 8:
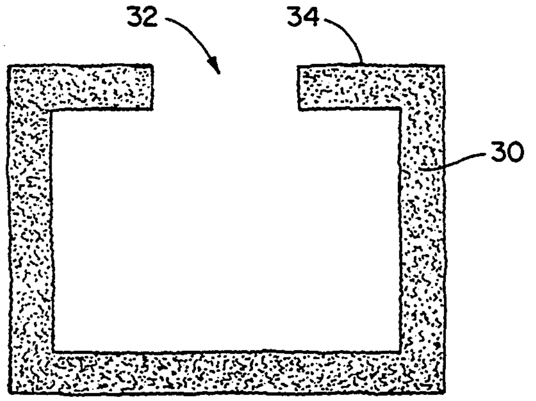
FIG. 8 is a plan view of a self adhering attachment structure for use with the base plate.
Figure 9:
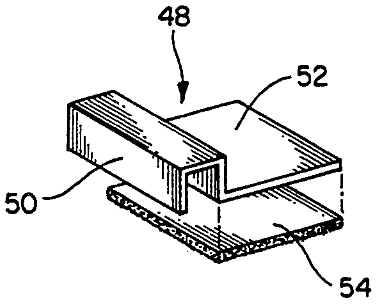
FIG. 9 shows engagement of an attachment structure to the connecting arm of the base plate.

Engaged about the forward opening 20 is a C shaped adherent mounting element 30 which is best illustrated in FIG. 8. The element 30 has a slot 32 therein in an upper wall 34 thereof for a purpose to be defined hereinafter. Such element 30 is preferably made of a material sold under the mark VELCRO. Adapted to attach to this mounting element 30 is a support plate 40 which has a cooperating mounting element 30' on a back surface 42 thereof which engages against and adheres to the mounting element 30 on the sleeve 16.

The support plate 40 is in the form of a picture frame and includes a channel 44 therein into which a filter element (not shown) may be slid and held. The base plate 40 further includes a Z shaped connecting arm or bracket 48 which includes a depending forward lip 50 secured to back side 42 of the base plate 40 in suitable manner. A rear end 52 of this bracket 48 extends through the open area or slot 32 in the mounting element 30 and is attached to a surface 53 of the light source housing 14 in a stabilizing fashion, such as by again using VELCRO pads 54.

The bracket 48 is provided with this particular configuration to accommodate a plurality of light housing styles, making the system 10 generic rather than specific.

Secured to a front wall 56 of the base plate 40 is a face plate 60 which incorporates thereon a plurality of paired hinge halves 62 facing away from the base plate 40 and extending radially outwardly of the face plate 60.

The face plate 60 is a planar picture frame structure having four sides 64. Each side 64 provides one pair of hinge halves 62 thereon to which a particular barn door 66 may be engaged in a rotatable manner to be described.

As shown in FIGS. 1, 13 and 14, the barn doors 66 are planar, rectangular elements each having one edge 68 which has chamfered corners 70 and along which a pair of hinge halves 62′ which coact with the hinge halves 62 on the face plate 60 are provided.

It will be obvious that the hinge halves 62 and 62′ are engageable in any suitable manner providing pivotability therebetween.

Thus, the barn doors 66 can be moved toward one another to form a square or rectangular tube or can be moved apart in flower petal fashion.

Depending on the relative positions the barn doors 66 are placed in, the directing of convergence of light is either increased or decreased, the convergence being greatest when the barn doors 66 are close together, forming the square or rectangular tube therebetween.

Within this arrangement of elements in the system 10, all lateral scatter from the light source lens is contained first by the sleeve 16 and then concentrated forwardly, in dependence upon the relative position of the barn doors 66.

Again, provision of the sleeve 16 creates a substantially universal system 10 which is universalized by the drawstring 24 form of engagement over any lens including an adjacent peripheral lip 15. Further, stability of the system 10 relative to the positioning thereof forward of the lens of the light source 14 is easily accomplished by the provision of the bracket 48 which, by its configuration, is capable of accommodating engagement to a variety of light housing 14 embodiments.

Turning now to FIGS. 15 and 16, the system 10′ is proposed for use where an even greater convergence of light, such as to a narrow beam, is required.

The system 10′ also includes a base plate 40′ and face plate 60′ mounted thereon, with the base plate 40′ incorporating a mounting bracket 48′ thereon.

Here, however, no sleeve is used since all light from the source 14 is to be directed through a narrow tube or snoot 70 engaged to and extending from the face plate 60′.

The base plate 40′ also includes a slotted channel 44′ therein which may engage a filter (not shown) therein.

Further, to ensure a tight fit of the system 10′ against the lens of the light source 14, a C-shaped cushion member 72 is placed between a back surface 42′ of the base plate 40′ and the lens, thereby directing all light into the tube or shoot 70.

Again, this cushion member is C-shaped to accommodate the bracket 48′.

It will be understood that the brackets 48 and 48′ are configured as shown to accommodate any lip formation 15 which may exist on the light source 14 adjacent the lens.

As described above, the system 10 and 10′ of the present invention provide a number of advantages, some of which have been described above and others of which are inherent in the invention. Also, modifications can be proposed without departing from the teachings herein. Accordingly, the scope of the invention is only to be limited as necessitated by the accompanying claims.

I claim:

1. A system for controlling light emanating from a light source in a photographic situation, the system comprising a sleeve which is engageable over a lens of the light source for directing light therefrom in a predetermined manner to cause convergence of the light into a chosen path, the sleeve having a larger in diameter end incorporating a drawstring and a smaller in diameter end incorporating a strip of engaging material about a periphery thereof, means for engaging a converging assembly to a housing of the light source in a manner to cause all light emanating from the light source to pass through the converging assembly, the converging assembly comprising a base plate which is in the form of a picture frame and which includes a strip of engaging material on a back surface thereof by means of which it is engaged to said sleeve and the base plate is adapted to engage a filter therein and having structure extending away from the lens therebehind in a manner to direct light from the lens substantially forward by limiting lateral scatter.

2. The system of claim 1 wherein said base plate has a narrow channel therein within which a filter may be received.

3. The system of claim 2 wherein said base plate has a rectangular face plate mounted thereon which is also configured as a frame having pairs of hinge halves mounted on each of four walls thereof.

4. The system of claim 3 wherein a plurality of barn doors are provided, the barn doors being planar rectangular elements having one edge which terminates in chamfered corners and has mounted therealong a pair of hinge halves in a manner for coaction with one pair of the hinge halves mounted on said face plate.

5. The system of claim 8 wherein said base plate has a Z-shaped bracket extending outwardly from the back surface thereof, the bracket having a planar section for engagement to a housing top surface of a light source and further having an upwardly stepped section for fitting over a peripheral lip framing a lens of the light source.

6. A system for controlling light emanating from a light source in a photographic situation, the system comprising structure engageable over a lens of the light source for directing light therefrom in a predetermined manner to cause convergence of the light into a chosen path, the structure comprising a base plate having a backing cushion thereon, said base plate and cushion being picture frame shaped, and wherein said base plate includes a mounting bracket thereon which extends from a back surface thereof and engages onto a top surface of a housing of the light source in a manner to cause all light emanating from the light source to pass through the base plate and cushion, and the base plate is adapted to engage a filter therein and has a construction which extends away from the lens therebehind in a manner to direct light from the lens substantially forward by limiting lateral scatter.

7. The system of claim 6 wherein said base plate has a channel therein for receiving and engaging a filter element.

8. The system of claim 7 wherein a face plate is engaged over a front surface of said base plate.

9. The system of claim 8 wherein said face plate is a planar element having a center aperture therein within and from which an elongate tube extends in a direction opposite said base plate.

10. The system of claim 9 wherein said mounting bracket for said base plate is Z-shaped, and further includes a depending forward flange which is engaged to said base plate back surface.

* * * * *

UNITED STATES PATENT AND TRADEMARK OFFICE

CERTIFICATE OF CORRECTION

PATENT NO. : 5,347,432

DATED : September 13, 1994

INVENTOR(S) : Gary J. Chiavetta

It is certified that error appears in the above-indentified patent and that said Letters Patent is hereby corrected as shown below:

The sheet of drawing consisting of figs. 10-16 should be deleted to appear as per attached sheet.

Sheet 4 of 4 of the drawings should be added to show figures 15 and 16 as per attached sheet.

Signed and Sealed this

Twentieth Day of June, 1995

Attest:

Bruce Lehman

BRUCE LEHMAN

*Attesting Officer*

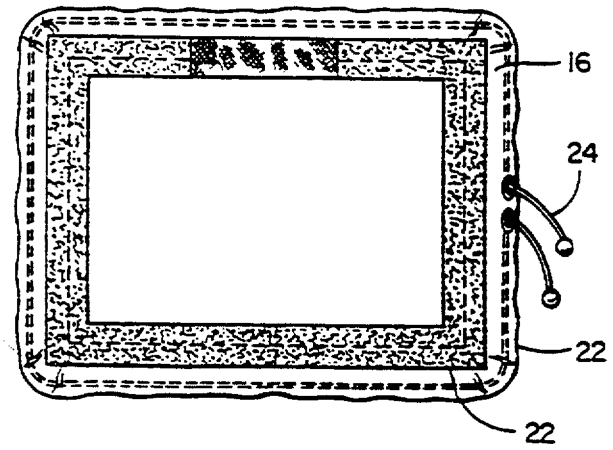
Fig. 10
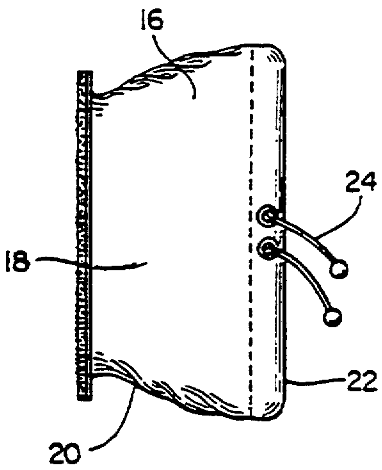
Fig. 11
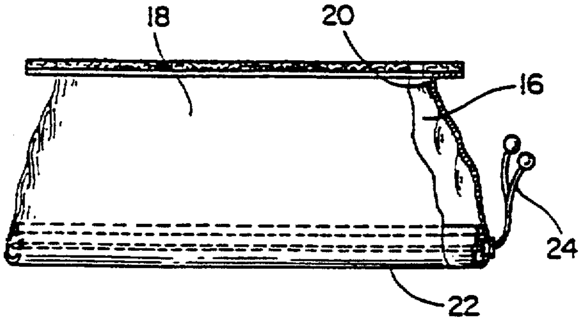
Fig. 12
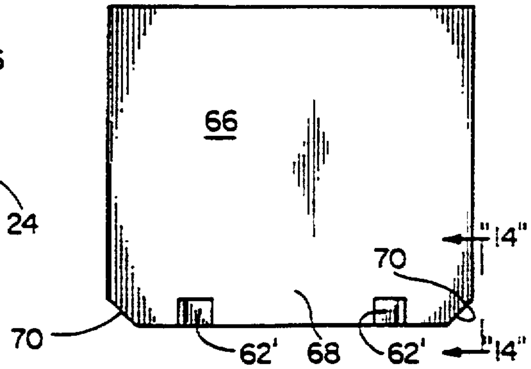
Fig. 13
Fig. 14
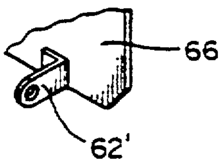

*Commissioner of Patents and Trademarks*